J. REBMAN.
AUTOMOBILE STEERING APPARATUS.
APPLICATION FILED MAY 6, 1916.

1,235,055.

Patented July 31, 1917.

INVENTOR.
Joseph Rebman.
BY
Jack M. Schley
ATTORNEY.

UNITED STATES PATENT OFFICE.

JOSEPH REBMAN, OF DALLAS, TEXAS.

AUTOMOBILE STEERING APPARATUS.

1,235,055. Specification of Letters Patent. Patented July 31, 1917.

Application filed May 6, 1916. Serial No. 95,768.

*To all whom it may concern:*

Be it known that I, JOSEPH REBMAN, citizen of the United States, residing at Dallas, in the county of Dallas and State of Texas, have invented certain new and useful Improvements in Automobile Steering Apparatus, of which the following is a specification.

This invention relates to new and useful improvements in automobile steering apparatuses.

In certain types of automobiles it has been found that by adding two rear wheels and mounting an enlarged body on the frame a considerable number of passengers may be carried and many advantages had as a public service vehicle.

In carrying out the invention the original frame or bed of the vehicle is extended rearwardly and an extra pair of wheels connected with the frame; or the vehicle may be built from the ground up with the view of mounting it on six wheels.

The rear axle which carries the extra or trailer wheels is pivoted at its center and arranged to turn like the front axle of an ordinary wagon. It is quite obvious that in turning around and turning corners the trailer wheels must be swung if the usual traffic conditions are to be met. For swinging said wheels a device is pivoted to the frame and the trailer wheels and axle connected therewith by radius rods through the agency of a universal joint. Flexible connections attached to the connecting rod between the front wheels are passed over pulleys and attached to the pivoted device so that the steering of the trailer wheels is accomplished in unison with the steering of the front wheels and no aditional effort is brought upon the driver.

Figure 1:
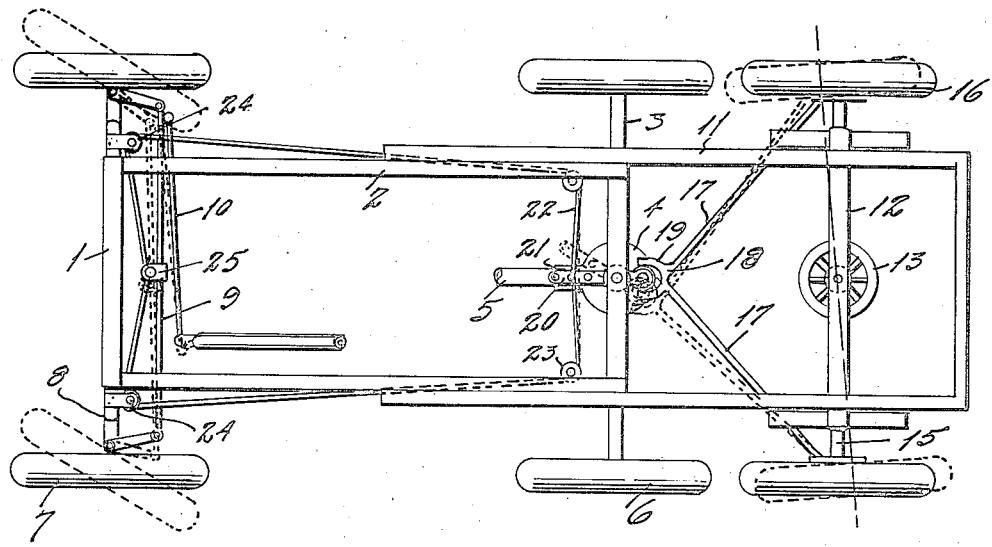
Figure 2:
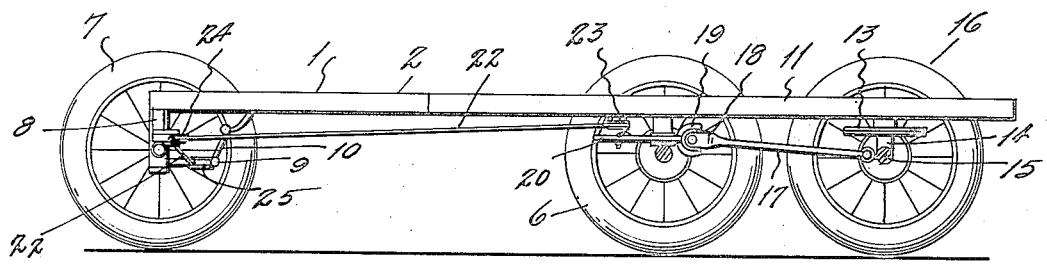

Other features of the invention will be apparent from a perusal of the following specification and the invention will be more readily understood by reference to the accompanying drawing in which an example of the invention is shown and wherein:

Figure 1 is a plan view of the frame and running gear of an automobile built in accordance with this invention, and Fig. 2 is a longitudinal vertical sectional view of the same.

In the drawing the numeral 1 designates a frame of an automobile, 2 the sills, 3 the rear axle, 4 the differential and 5 the driving shaft. The rear axle is mounted on the usual wheels 6 and the forward end of the frame is carried on the front axle construction 8 which is supported by front wheels 7 connected by a rod 9. The rod 9 is attached to the end of the usual steering rod 10. The parts which have been described are of the usual construction and my invention is combined therewith. Extension sills 11 are attached to the sills 2 and projected rearwardly whereby the frame 1 is elongated.

A cross bar 12 is mounted transversely of the extended frame and has the upper part of a turntable 13 attached thereto while the lower part is attached to the spring support 14 which carries the trailer axle 15. Wheels 16 are mounted on the axle 15 and radius rods 17 forming a yoke extend from the axle structure forward and are merged into a fork 18 forming part of a universal joint 19.

On the main frame a lever 20 is centrally pivoted over the differential 4 and attached at its rear end to the universal joint. The forward end of the lever has a plurality of holes 21 in one of which the ends of flexible connections 22 are attached. These holes provide an adjustment whereby the swing or "throw" of the lever 20 is governed. Each connection 22 runs over a pulley 23 at the side of the frame and extends forward and around a pulley 24 on the front axle construction 8 and then to the center of the connecting rod 9 where it is attached to a clip 25 fastened on said rod.

It will be seen by observing Fig. 1 that the trailer axle is swung when the rod 9 is shifted and as shown by dotted lines the front end of the lever 20 is swung in the same direction as the front wheels. This causes the rear end of said lever to swing in the opposite direction whereby the trailer axle is swung through the agency of the rod 17 and the wheel 16 properly positioned to follow the front wheels. When the steering wheel (not shown) is manipulated to swing the front wheels the trailer wheels will be guided at the same time.

It will be noted that the driving mechanism or power transmission is not altered and therefore the usual construction need not be altered. It is pointed out that the trailer construction may be added to an automobile or the entire structure may be built up if desired. A vehicle constructed in accordance with this invention will not only carry an increased number of passengers in a comfortable manner, but may be turned on a comparatively short radius.

What I claim is:

1. In an automobile steering apparatus, the combination with the frame, front and back wheels and steering gear of an automobile, of an axle structure hinged in rear of the back wheels, trailer wheels supporting said axle, a swinging member mounted on the frame and having swivel connection with the axle structure whereby the latter is hinged, and flexible connections extended from each side of swinging member and connected with the steering gear of the automobile.

2. The combination with the frame and running gear of an automobile, of an extension frame mounted on the rear of the main frame, an axle structure hinged under the extension frame, trailer wheels mounted on the axle, a swinging device mounted on the main frame and having connection with the trailer axle, and connections between said device and the steering gear of the automobile.

3. The combination with the frame and running gear of an automobile, of an extension frame mounted on the rear of the main frame, an axle structure pivoted under the extension frame, trailer wheels mounted on the axle, a swinging device mounted on the rear end of the main frame, radius rods extending forward from the pivoted axle and having universal connection with the swinging device, and flexible connections mounted on the frame and having their rear ends attached to the swinging device and the forward ends connected with the steering gear of the automobile.

In testimony whereof I affix my signature.

JOSEPH REBMAN.